United States Patent [19]
Ridout

[11] Patent Number: 5,686,881
[45] Date of Patent: Nov. 11, 1997

[54] AUTOMATIC PHONE LIGHT

[76] Inventor: John G. Ridout, 656 Schuler Hollow Rd., Lucasville, Ohio 45648

[21] Appl. No.: 651,207

[22] Filed: May 22, 1996

[51] Int. Cl.$^6$ ................................................. H04M 1/00
[52] U.S. Cl. ................... 340/332; 340/309.15; 340/331; 379/376; 379/396
[58] Field of Search .................................. 340/332, 331, 340/309.15; 379/376, 373, 396

[56] References Cited

U.S. PATENT DOCUMENTS

| | | | |
|---|---|---|---|
| 2,616,972 | 11/1952 | McNutt | 379/376 |
| 4,379,210 | 4/1983 | Sparber | 379/376 |
| 4,747,133 | 5/1988 | Valenzona et al. | 379/376 |
| 4,951,311 | 8/1990 | Sterr | 379/376 |
| 5,379,319 | 1/1995 | Satoh et al. | 379/387 |

*Primary Examiner*—Jeffery Hopsass
*Assistant Examiner*—Edward Lefkowitz
*Attorney, Agent, or Firm*—Michael I. Kroll

[57] ABSTRACT

The present invention relates to a first automatic phone light system (110) functioning to turn a light (14) ON, in response to a telephone call received by a telephone line (16A), for a preset period of time predetermined by a timer (24) when a photocell (20) detects darkness in a room. The first automatic phone light system (110) comprises a housing (12) having a converter module (22) electrically connected to the light (14) having the timer (24) with the photocell (20) electrically connected therebetween. The converter module (22) is electrically connected to power connector (18A) which is electrically connectable to power (18). A power switch (18B) is electrically connected between the power connector (18A) and the converter module (22). A first telephone line connector receptacle (116AAA) is electrically connected to the converter module (22). The first telephone line connector receptacle (116AAA) is electrically connected to a first telephone line connector (16AA) which is electrically connected to the telephone line (16A). The telephone line (16A) is further electrically connected to a second telephone line connector (16AB) which is electrically connected to a telephone (16). A second automatic phone light system (210) having a second converter module (222), a second power switch (218B), a second power connector (218A), a second telephone line connector first receptacle (216AAA) and a second telephone line connector second receptacle (216AAB) is discussed in detail herein.

1 Claim, 4 Drawing Sheets

AUTOMATIC PHONE LIGHT

BACKGROUND OF THE INVENTION

1. Field of the Invention

The present invention relates to an automatic phone light. More particularly, the present invention relates to an automatic phone light that turns on in darkness when the telephone rings so that a user can see the phone to pick it up.

2. Description of the Prior Art

Telephone answering machines, infrared sensing apparatuses for phones, ringing detectors for the deaf, telephone lighted operating means are well known in the art. However, none of the devices describe nor claim an automatic phone light system which comprises additional features such as a photocell, a converter module, and a timer as described and claimed in the present invention.

Numerous innovations for automatic telephone timers have been provided in the prior art that are described as follows. Even though these innovations may be suitable for the specific individual purposes to which they address, they differ from the present invention as hereinafter contrasted.

In U.S. Pat. No. 2,616,972, titled, TELEPHONE OPERATED LIGHTING MEANS, by inventor, McNutt, a device is disclosed wherein lights are operated by telephones, and has for its object the provision of a construction and arrangement whereby a light energized by an ordinary house circuit may be turned on by ringing of the telephone. The present invention differs substantially from the patented invention. The patented invention has a diaphragm which is responsive to vibration of a ring and a pivotable switch armature whereas the present invention has a photocell, a converter module, and a timer.

In U.S. Pat. No. 4,379,210, titled, RINGING DETECTOR FOR USE BY THE DEAF, by inventor Sparber, a ringing detector circuit which is connected between the tip and ring conductors of a subscriber set to cause an incandescent lamp to flash at half brightness when ringing voltage is applied thereto. The present invention has invention has a photocell, a converter module, and a timer which differs from the patented invention having a first rectifier connected between the illuminating device and a power source and further having a second rectifier means connected between the illuminating device and a power source functioning to produce a higher level of illumination.

In U.S. Pat. No. 5,379,319, titled, TELEPHONE APPARATUS, by inventor Satoh, a telephone apparatus is described having an infrared sensor to produce a signal to illuminate a lamp. The patented invention has a telephone number registration means, a calling means for transmitting one of the stored telephone numbers, a human body approach sensing means and a control means which differs substantially from the present invention which comprises a photocell, a converter module, and a timer.

Numerous innovations for telephone apparatuses have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to an automatic phone light. More particularly, the present invention relates to an automatic phone light that turns on in darkness when the telephone rings so that a user can see the phone to pick it up.

The present invention functions that when a telephone rings and there is minimal light present in the room, as detected by the photo cell, the light turns ON. Conversely, if there is ample light in the room, if the telephone rings, the light does not turn ON.

The types of problems encountered in the prior art are when people are sleeping with minimal light in the room, it is hard to locate a telephone when it rings.

In the prior art, unsuccessful attempts to solve this problem were attempted namely: connecting a telephone line to a converter which turned on the light when the telephone rang. However, the problem was solved by the present invention because a photocell and timer was incorporated within the design to overcome the problem of turning the light on for prolonged periods of time as well as turning the light on when ample light was available in the room.

Innovations within the prior art are rapidly being exploited in the field of telephone related electronics.

The present invention went contrary to the teaching of the art which teaches direct electrical links between the telephone and the light lacking a photocell and a timer.

The present invention solved a long felt need to have the light turn ON, when minimal light is present in, response to a telephone call.

The present invention produced unexpected results namely: people had a more sound sleep when using the automatic phone light because they were not psychologically paranoid that the telephone would ring and they could not locate it in the dark.

Accordingly, it is an object of the present invention to provide an automatic phone light which comprises a housing containing a light, a first telephone line connector, a second telephone line connector, a power means electrically connected thereto, a photocell, a converter module, and a timer.

More particularly, it is an object of the present invention to provide a power means comprising a power means connector, a power means switch, a power means first output, a power means second output, a power means negative output, a power means positive output.

In keeping with these objects, and with others which will become apparent hereinafter, one feature of the present invention resides, briefly stated, in the converter module comprises a converter module transformer, a converter module capacitor, a converter module LED, a converter module detector, a converter module PPN, a converter module resistor, a converter module coil, a converter module transistor, a converter module potentiometer, a converter module diode, and a converter module ground.

When the automatic phone light system is designed in accordance with the present invention, the timer comprises a timer control knob having corresponding timer control knob markings, a timer potentiometer, a timer ground, a timer diode, a timer coil, a timer switch, and a timer single pole switch.

In accordance with another feature of the present invention, a first automatic phone light system has a first telephone line connector receptacle in a first embodiment.

Another feature of the present invention is that a second automatic phone light system comprises a second telephone line connector first receptacle and a second telephone line connector second receptacle.

Yet another feature of the present invention is that second automatic phone light system further comprises a second power means connector, a second power means switch, and a second converter module.

3

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

Common Elements of First and Second Embodiments

12—housing (12)
14—light (14)
16—telephone (16)
16A—telephone line (16A)
16AA—first telephone line connector (16AA)
16AB—second telephone line connector (16AB)
18—power means (18)
18A—power means connector (18A)
18B—power means switch (18B)
18C—power means first output (18C)
18D—power means second output (18D)
18E—power means negative output (18E)
18F—power means positive output (18F)
20—photocell (20)
22—converter module (22)
22A—converter module transformer (22A)
22B—converter module capacitor (22B)
22C—converter module LED (22C)
22D—converter module detector (22D)
22E—converter module PPN (22E)
22F—converter module resistor (22F)
22G—converter module coil (22G)
22H—converter module transistor (22H)
22I—converter module potentiometer (22I)
22J—converter module diode (22J)
22K—converter module ground (22K)
24—timer (24)
24A—timer control knob (24A)
24AA—timer control knob markings (24AA)
24B—timer potentiometer (24B)
24C—timer ground (24C)
24D—timer diode (24D)
24E—timer coil (24E)
24F—timer switch (24F)
24G—timer single pole switch (24G)

First Embodiment

110—first automatic phone light system (110)
116AAA—first telephone line connector receptacle (116AAA)

Second Embodiment

210—second automatic phone light system (210)
216AAA—second telephone line connector first receptacle (216AAA)
216AAB—second telephone line connector second receptacle (216AAB)
218A—second power means connector (218A)
218B—second power means switch (218B)
222—second converter module (222)

4

Figure 1:
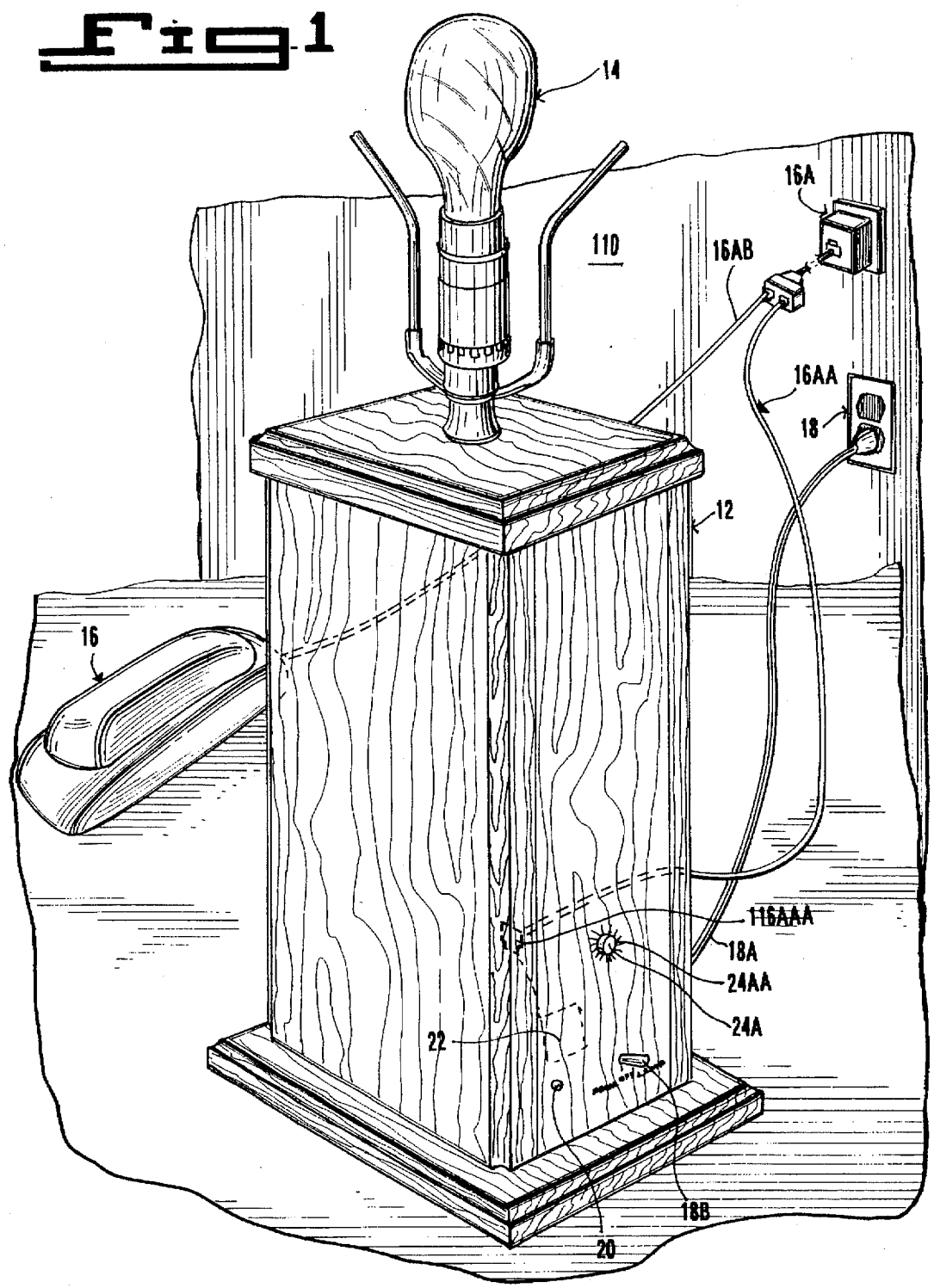
FIG. 1 is a top perspective view of a first automatic phone light system.
Figure 1A:
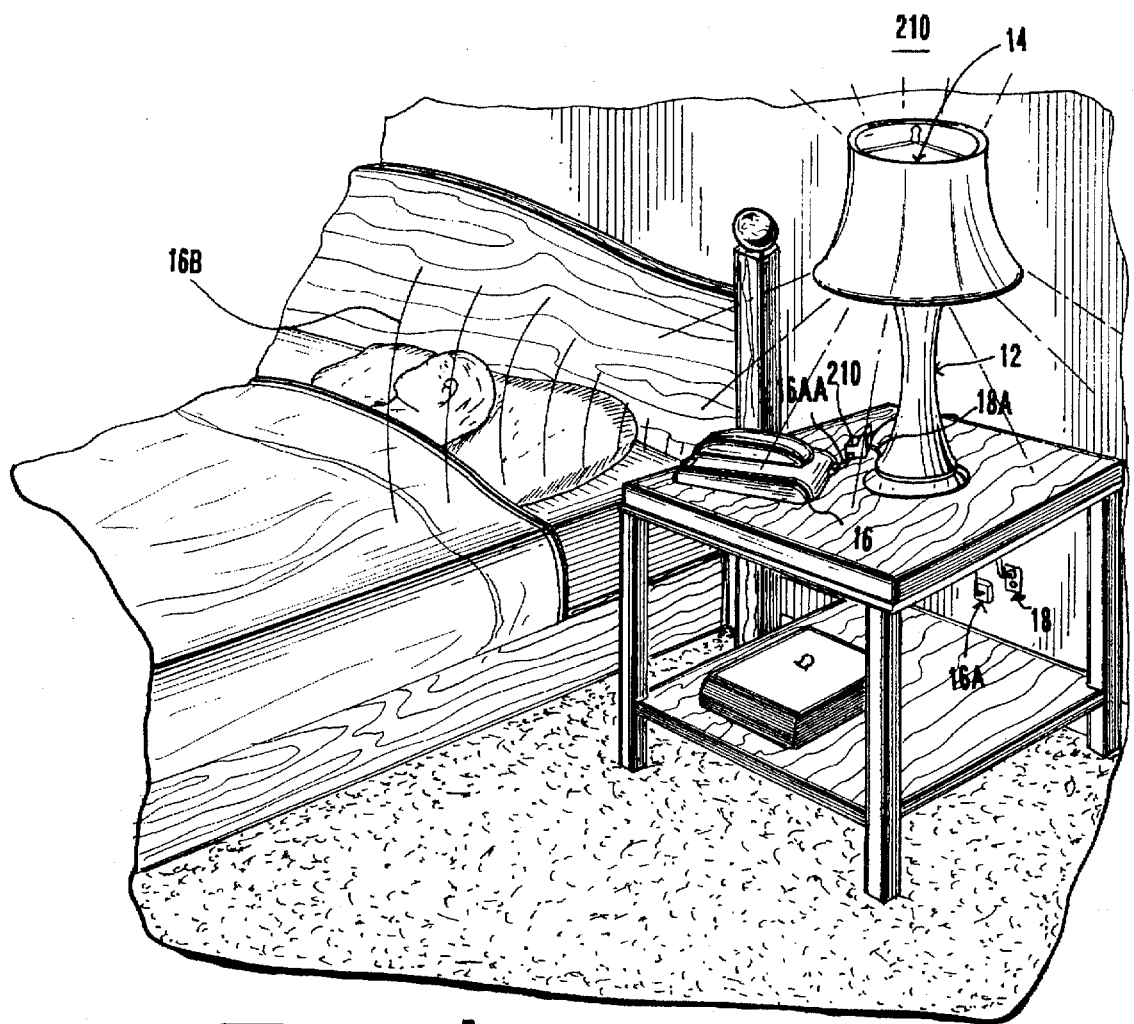

FIG. 1a is a top perspective view of a second automatic phone light system.

Figure 2A:
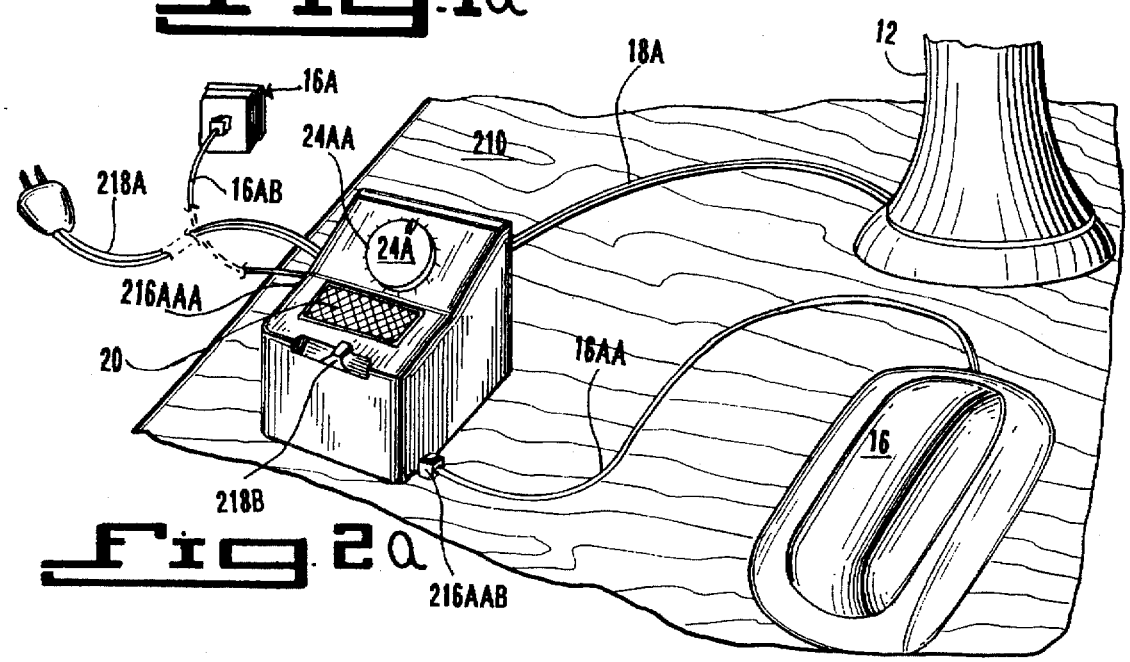

FIG. 2a is a top perspective enlarged view of a second automatic phone light system.

Figure 2:
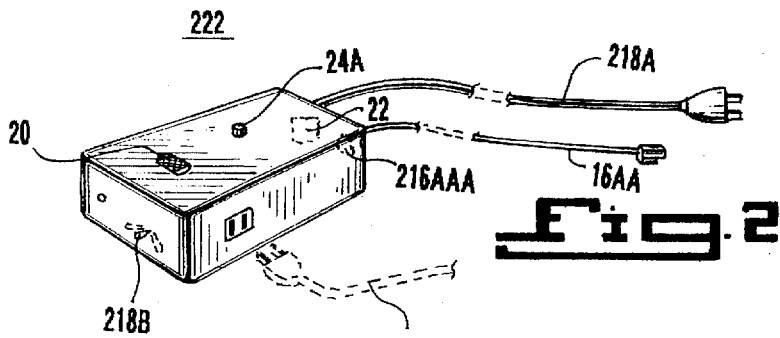

FIG. 2 is a top perspective view of a second converter module.

Figure 3:
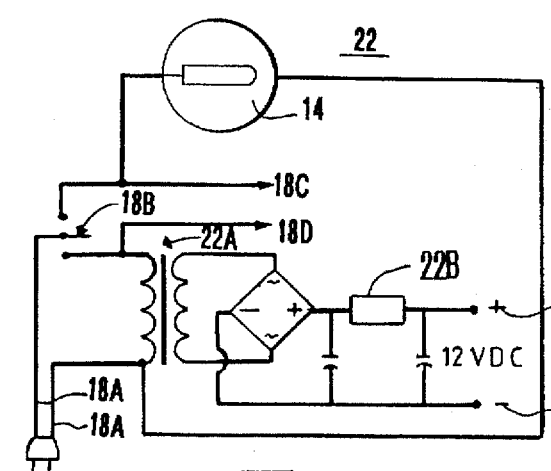

FIG. 3 is an electrical schematic of a converter module.

Figure 3A:
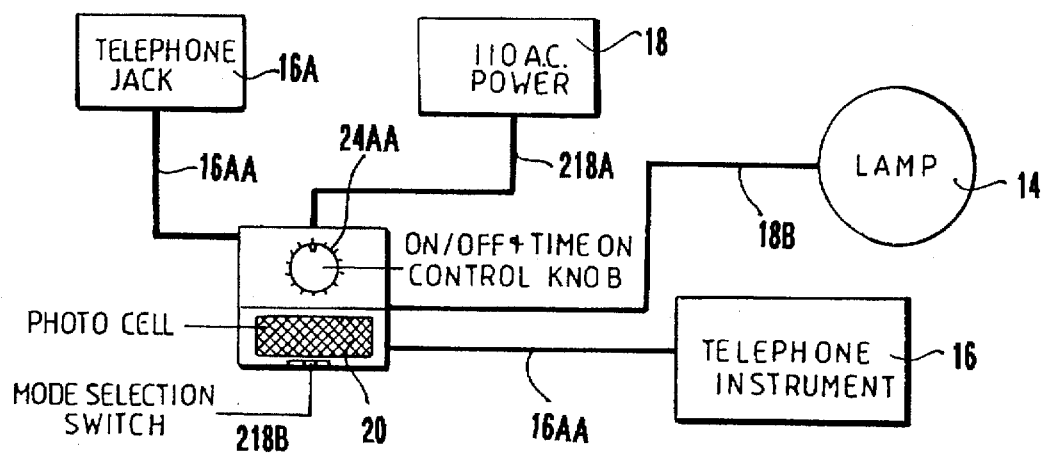

FIG. 3a is an block diagram of a second automatic phone light system.

Figure 4:
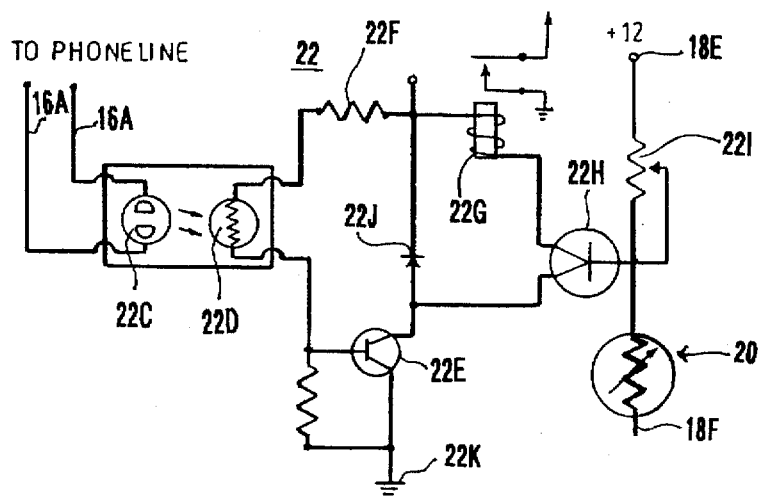

FIG. 4 is an electrical schematic of a converter module.

Figure 4A:
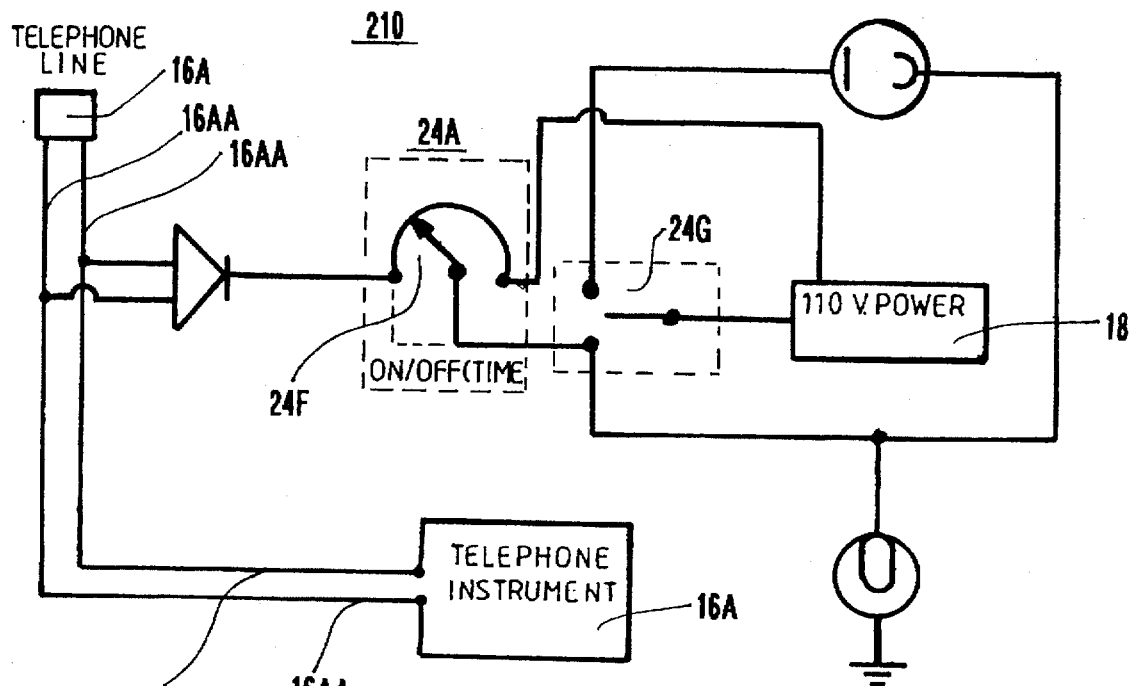

FIG. 4a is an electrical schematic of a second automatic phone light system.

Figure 5:
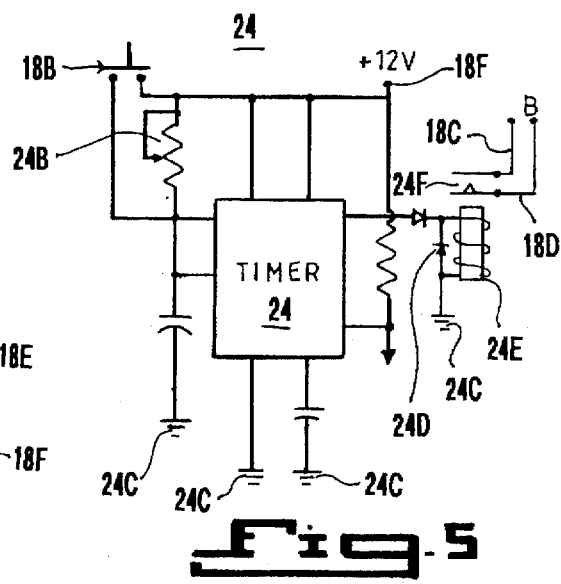

FIG. 5 is an electrical schematic of a timer.

DESCRIPTION OF THE PREFERRED EMBODIMENT

Firstly, referring to FIG. 1 which is a top perspective view of a first automatic phone light system (110). The housing (12) contains a light (14) which is electrically connected to a converter module (22). The converter module (22) is electrically connected to a photocell (20), a first telephone line connector receptacle (116AAA), a power means switch (18B), a timer (24) and a power means (18). The power means (18) is turned on and off by the power means switch (1 8B) which is electrically connected on a power means connector (18A) between the power means (18) and the converter module (22). The telephone line (16A) is electrically connected to a telephone (16). The timer (24) has a timer control knob (24A) with corresponding timer control knob markings (24AA) which function to indicate to a user how much time is preset. The telephone line (16A) is electrically connected to a first telephone line connector (16AA) which is electrically connected to the first telephone line connector receptacle (116AAA). The telephone (16) is electrically connected by a second telephone line connector (16AB) to the telephone line (16A).

The first automatic phone light system (110) functions as follows:

1. When a telephone call is received by the telephone line (16A), an electronic signal is imputed to the second telephone line connector (16AB) and hence the telephone (16) which results in a telephone ring.
2. Concurrently, when a telephone call is received by the telephone line (16A), an electronic signal is imputed to the first telephone line connector (16AB) and hence the first telephone line connector receptacle (116AAA).
3. If the photocell (20) detects sufficient light, the converter module (22) does not function to turn the light (14) ON.
4. If the photocell (20) does not detect sufficient light, the converter module (22) is activated turning the light (14) ON for a preset time period which is determined by the timer (24).

Referring to FIGS. 1a, FIG. 2, FIG. 2a, and FIG. 3a which are top perspective views, an enlarged view and a block diagram of a second automatic phone light system (210), respectively. The second automatic phone light system (210) has a stand alone unit consisting of a second power means connector (218A), a second power means switch (218B), a second converter module (222), a photocell (20), a timer (24), and a timer control knob (24A) with timer control knob markings (24AA). The power means (18) is electrically connected to the second power means connector (218A) which is electrically connected to the second converter module (222) having the second power means switch (218B) electrically connected therebetween. The second converter module (222) is electrically connected to the light (14) via the power means connector (18A), the telephone (16) via the first telephone line connector first receptacle (116AAA), the timer (24), and the photocell (20).

The second automatic phone light system (210) functions as follows:

1. When a telephone call is received by the telephone line (16A), an electronic signal is imputed to the second telephone line connector (16AB) to the second telephone line connector first receptacle (216AAA) through the second converter module (222) to the second telephone line connector second receptacle (216AAB) to the first telephone line connector (16AA) and hence the telephone (16) which results in a telephone ring (16B).
2. Concurrently, when a telephone call is received by the telephone line (16A), an electronic signal is imputed to the first telephone line connector (16AB) and hence the first telephone line connector first receptacle (116AAA).
3. If the photocell (20) detects sufficient light, the second converter module (222) does not function to turn the light (14) ON.
4. If the photocell (20) does not detect sufficient light, the second converter module (222) is activated turning the light (14) ON for a preset time period which is determined by the timer (24).

Referring to FIG. 3 and FIG. 4 which are electrical schematics of a converter module (22). The converter module (22) comprises a power means connector (18A) electrically connected to a power means switch (18B) which is electrically connected to a light (14). The power means switch (18B) is also electrically connected to a converter module transformer (22A) which is electrically connected to a converter module capacitor (22B) having a power means negative output (18E) and a power means positive output (18F) therefrom. When the power means switch (18B) is activated it electronically connects the power means connector (18A) to either the power means first output (18C), thus turning the light (14) ON or the power means second output (18D). The converter module (22) further comprises the power means negative output (18E) electrically connected to a converter module potentiometer (22I) and the power means positive output (18F) electrically connected to a photocell (20). The photocell (20) and the converter module potentiometer (22I) are electrically connected to a converter module transistor (22H) which is electrically connected to a converter module coil (22G) and a converter module PPN (22E). The converter module coil (22G) and the converter module PPN (22E) have a converter module diode (22J) electrically connected therebetween. The converter module PPN (22E) is electrically connected to a converter module detector (22D) and a converter module ground (22K). The converter module coil (22G) is electrically connected to a converter module resistor (22F) which is electrically connected to the converter module detector (22D). The converter module detector (22D) is electrically connected to a converter module LED (22C) which is electrically connected to telephone line (16A).

Lastly, referring to FIGS. 4a and FIG. 5 which are an electrical schematic of a second automatic phone light system (210) and a timer (24). The timer (24) comprises a power means positive output (18F) which is electrically connected to a power means switch (18B) and a timer coil (24E). The power means positive output (18F) is further electrically connected to a timer potentiometer (24B) which is electrically connected to a timer ground (24C). The timer coil (24E) is electrically connected to a timer ground (24C) and a timer diode (24D). A timer switch (24F) is when activated is electronically connected to the timer coil (24E) and a timer single pole switch (24G). The timer switch (24F) is electronically connected to the power means first output (18C) and the power means second output (18D).

It will be understood that each of the elements described above, or two or more together, may also find a useful application in other types of constructions differing from the type described above.

While the invention has been illustrated and described as embodied in an automatic phone light system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic phone light system comprising:
    a) a telephone line receptacle;
    b) a telephone line splitter connected to said receptacle having two telephone lines therefrom for carrying a telephone signal appearing at said receptacle;
    c) a telephone connected to one of said telephone lines to receive said telephone signal;
    d) a lamp base for supporting an electric light;
    e) convertible module means within said lamp base connected to a source of electric power for delivering power to said electric light;
    f) a photocell connected to said convertible module means for indicating to said module means when ambient lighting is below a predetermined level;
    g) said convertible means being connected to the second telephone line to receive said telephone signal;
    h) said convertible means being activated by an incoming signal on the second telephone line to deliver electric power to said electric light when said photocell indicates that the ambient lighting is below said predetermined level, thereby providing lighting when said telephone receives a telephone call;
    i) timing means for terminating power to said electric light after a preselected period of time, said timing means including adjustable means for selecting said period of time; and
    j) said converter module means comprising a power means connector electrically connected to a power means switch having an OFF position, a first position directly connected to said light for bypassing control by said photocell, and a second position connected to a transformer which is connected to a capacitor having first and second power output lines, the power means first output line being connected to a potentiometer and the power means second output line connected to said photocell, said photocell and said potentiometer being connected to a transistor, said transistor being connected to a coil and a PPN, the coil and the PPN having a diode connected therebetween, the PPN being connected to a detector and ground, the coil being connected to a resistor which is connected to the detector, and said detector being connected to a LED which is electrically connected to said second telephone line.

* * * * *